April 23, 1957
A. SOSS
2,789,310
AUTOMATIC BEEF SPLITTING TABLE
Filed June 10, 1955
2 Sheets-Sheet 1
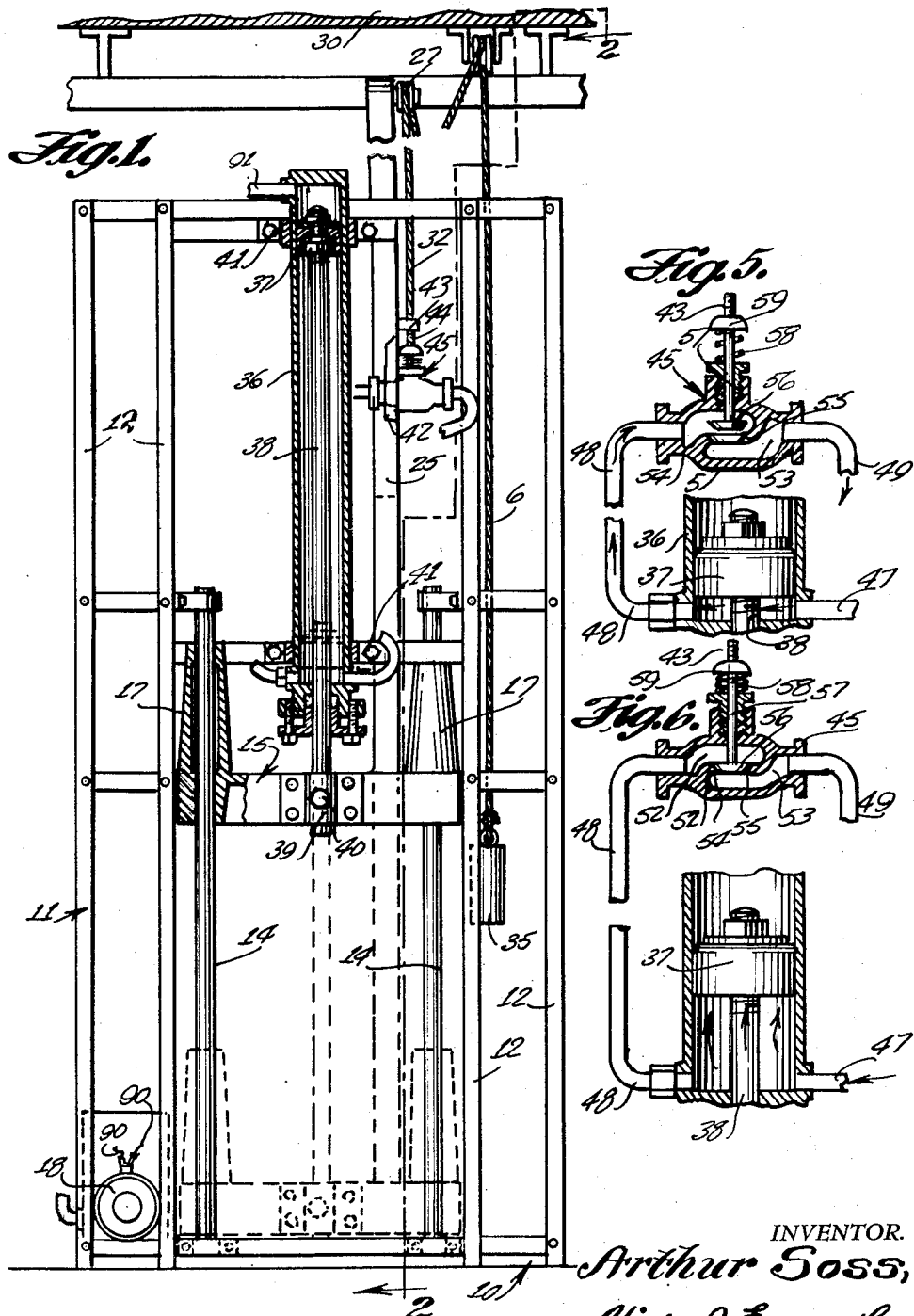
INVENTOR.
Arthur Soss,
BY Victor J. Evans & Co.
ATTORNEYS April 23, 1957 — A. SOSS — 2,789,310
AUTOMATIC BEEF SPLITTING TABLE
Filed June 10, 1955 — 2 Sheets-Sheet 2
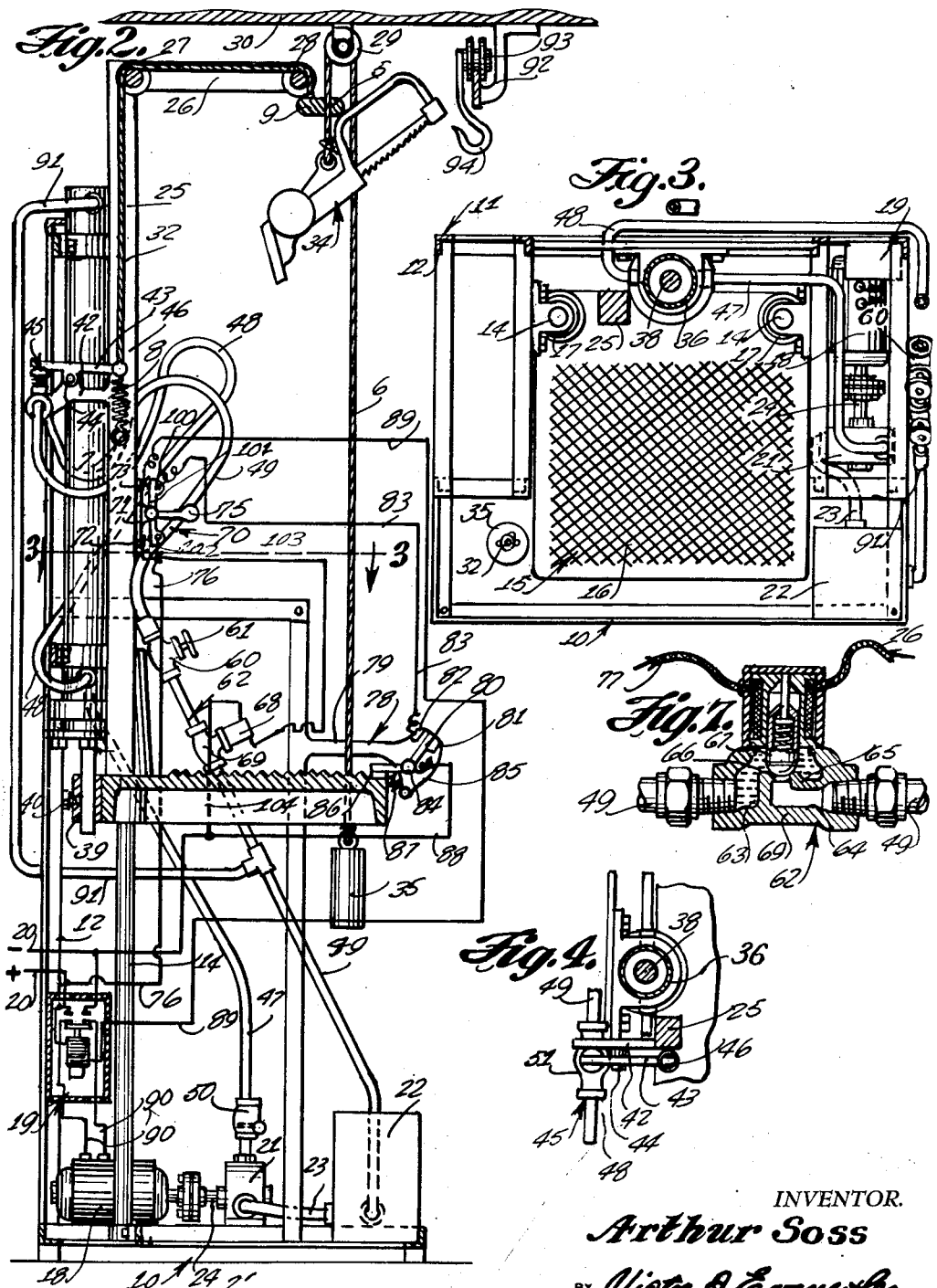
INVENTOR.
Arthur Soss
BY Victor J. Evans & Co.
ATTORNEYS

United States Patent Office 2,789,310
Patented Apr. 23, 1957

2,789,310

AUTOMATIC BEEF SPLITTING TABLE

Arthur Soss, McCook, Nebr.

Application June 10, 1955, Serial No. 514,455

4 Claims. (Cl. 17—23)

This invention relates to a cutting assembly, and more particularly to an apparatus for use in splitting or cutting carcasses of beef or the like.

The object of the invention is to provide an apparatus for use in splitting or cutting various materials such as large sections of beef which may be suspended from an overhead hook such as in a meat packing plant.

Another object of the invention is to provide a cutting assembly which includes a suitable cutting tool or implement such as a beef splitting saw, there being a movable platform which supports the operator or user of the cutting implement, and whereby the platform or table moves up and down to permit the operator to readily cut the piece of beef or other material from top to bottom while in a standing position.

A further object of the invention is to provide a cutting assembly which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a rear elevational view of the cutting assembly, with parts broken away and in section.

Figure 2 is a sectional view taken on the line 2—2 of Figure 1.

Figure 3 is a sectional view taken on the line 3—3 of Figure 2.

Figure 4 is a fragmentary horizontal sectional view illustrating the automatic control valve mounting.

Figure 5 is a sectional view taken through the automatic control valve and the lower portion of the cylinder.

Figure 6 is a view similar to Figure 5 but showing the valve in closed position in the piston raised in the cylinder.

Figure 7 is a sectional view taken through the solenoid valve.

Referring in detail to the drawings, the numeral 10 designates a horizontally disposed lower base, and extending upwardly from the base 10 and secured thereto is a framework 11 which includes a plurality or spaced parallel vertically disposed posts 12 which can be made of any suitable material such as angle iron. Also extending upwardly from the base 10 and secured thereto is a pair of spaced parallel cylindrical rods or guide bars 14. A vertically shiftable or adjustable platform or table 15 is provided with a pair of bearings 17 which are slidably mounted on the rods or guide bars 14, and the platform 15 is adapted to support a man or operator who is cutting carcasses or sections of beef. The upper surface of the platform 15 may be roughened as at 16 so as to prevent the operator from accidentally slipping on the movable platform 15.

Mounted on the base 10 is an electric motor 18, and secured within the frame 11 is an outlet box 19 which is adapted to be connected to a suitable source of electrical energy by means of wires 20, Figure 2. A hydraulic fluid pump 21 is driven by the motor 18 through the medium of a shaft 24, and a tank or reservoir 22 is also mounted on the base 10. A hose or conduit 23 connects the pump 21 to the tank 22.

Extending upwardly from the platform 15 and secured thereto is a vertically disposed movable standard 25 which has a horizontally disposed arm 26 secured to its upper end. Pulleys 27 and 28 are journaled on the upper end of the standard 25 and arm 26, Figure 2, and a pulley 29 is adapted to be connected to a ceiling 30 through the medium of a bracket 31. A cable or cord 32 is trained over the pulleys 27 and 28, and the cable 32 has one end connected to a weight 9, while the other end of the cable 32 is connected to a lever 43, there being a coil spring 8 having one end anchored to the frame by means of a pin 7, while the other end of the coil spring 8 is connected to a lever 43. A cable 6 is arranged in engagement with the pulley 29, and the cable 6 passes through an opening 5 in the weight 9 and the cable 6 has one end connected to a cutting saw 34. A counterweight 35 is connected to one end of the cable 6.

There is further provided a stationary cylinder 36 which may be secured to the frame 11 through the medium of securing elements 41, and the cylinder 36 includes an inner reciprocating or movable piston 37 that has a rod 38 secured thereto. The piston rod 38 projects through the lower end of the cylinder 36, and the rod 38 is connected to a bushing 39 by means of a set screw, the bushing 39 being formed integral with or secured to the platform 15.

Extending outwardly from the standard 25 and secured thereto, is a bracket 42, and the lever 43 is pivotally connected to the bracket 42 through the medium of a pin 44. The lever 43 actuates an automatic control valve 45 as later described in this application.

A conduit 47 connects the hydraulic pump 21 to the lower end of the cylinder 36, and a second conduit 48 leads from the lower end of the cylinder 36 to the automatic control valve 45.

A conduit 49 leads from the other side of the automatic control valve 45 back to the reservoir tank 22, and the conduits 49 and 48 may be flexible, there being a check valve 50 in the conduit 47.

The construction of the automatic control valve 45 is shown in detail in Figures 5 and 6 wherein the numeral 51 designates a casing which includes inner compartments 52 and 53 that are separated by means of a partition or baffle 54, there being an opening or valve seat 55 in the partition 54. A valve member 56 is mounted for movement into and out of bridging or closing relation with respect to the valve seat 55, and the valve member 56 is secured to the lower end of a stem 57 which has a coil spring 58 circumposed thereon, there being a head 59 on the upper end of the stem 57, and the pivotally mounted lever 43 may be secured to the head 59 in any suitable manner, as for example by means of welding.

Interposed in the conduit 49 is a throttle valve 60, and the throttle valve 60 can be operated or adjusted by means of a handle 61.

Also arranged in the line or conduit 49 is a solenoid valve 62 which is shown in detail in Figure 7. The solenoid valve 62 includes a housing or casing 69 which is provided with inner compartments 63 and 64 that are separated by means of a baffle 65 which has an opening or valve seat 66 therein. A plunger 67 is mounted for movement into and out of closing relation with respect to the opening 66, and a solenoid 68 is provided for controlling movement of the plunger 67.

The electrical hook up for the present invention is shown in detail in Figure 2. Thus, there is provided a manually operable switch 70 which includes a plate 71 that may be secured to the frame 11. Contacts 72 and 73 extend outwardly from the plate 71, and a manually operable lever 74 is pivotally connected to the plate through the medium of a pin 75. A wire 76 leads from the movable contact 102 on the switch 70 to one of the input wires 20. A wire 77 also leads from the solenoid 68 to the contact 72.

There is further provided a limit switch which is indicated generally by the numeral 78, and the limit switch 78 includes a bracket 79 which may be secured to one of the upstanding posts of the framework 11. The limit switch 78 includes a lever 80 that is pivotally connected to a plate portion 85 of the switch 78 through the medium of a pivot pin 84. A stop lug 81 is provided for limiting movement of the lever 80 in one direction, and the lever 80 is mounted for movement into and out of electrical engagement with a contact 82, there being a wire 83 leading from the contact 82 to a contact 100 on the movable portion 101 of the switch 70. A wire 103 leads from contact 72 to the solenoid 68, and a wire 104 leads from the solenoid 68 to a wire 88. A finger or lug 86 is formed integral with the lever 80 or secured thereto, and the finger 86 is adapted to be engaged by the platform 15 as the platform 15 moves upwardly. A coil spring 87 is connected to the finger 86, and the coil spring 87 may also be connected to the plate portion 85 of the switch 78. The wire 88 leads from an input line 20 to the lever 80. A wire 89 leads from the stationary contact 73 of the switch 70, to the outlet box 19, and wires 90 lead from the outlet box 19 to the motor 18. A vent line or conduit 91 leads from the top of the cylinder 36 back to the conduit 49. The switch 70 is constructed so that by shifting the lever or handle 74 in the upward position as shown in Figure 2, the contact 100 will move into engagement with the contact 73. As shown in Figure 2 the switch is in a neutral position. By moving the handle 74 downwardly, the contact 102 will engage the contact 72.

From the foregoing it is apparent that there has been provided a cutting assembly wherein a person will be able to readily sever or cut carcasses, or large sections of beef while remaining in a standing position. A bracket 92 may be secured to the ceiling 30, and a carrier 93 may be mounted on the bracket 92, there being a hook 94 depending from the carrier or carriage 93, and the hook 94 is adapted to be used for supporting the beef or other meat which is to be cut by the saw 34. Since the platform or table 15 moves vertically and since this platform 15 supports the person using the saw 34, then the side of beef can be cut from top to bottom while the operator and platform 15 are moving downwardly so that the task of cutting the meat is greatly simplified.

It is to be noted that the cable 32 is a separate cable from the cable 6, and the cable 32 operates the control valve 45. The cable 32 has the weight 9 connected thereto, and the weight 9 is provided with an opening 5 through which the cable 6 extends. The weight 9 is heavy enough to open the valve 45 to thereby permit the platform 15 to descend or lower as fast as the saw 34 moves downward.

To raise the platform 15, it is only necessary to move the manual control valve 70 to the up position shown in Figure 2 so that the circuit to the motor 18 will be completed and this will cause the pump 21 to force the fluid into the bottom of the cylinder 36 to thereby raise the platform 15 until the platform reaches the limit switch 78 and contacts the finger 86 to thereby open the circuit and stop the motor 18 and pump 21.

The saw 34 is a splitting saw. The purpose of the conduit or pipe 91 is to provide a vent from the top of the cylinder 36 to thereby permit air that is in the cylinder to escape into the receiver 22 as the piston 37 travels upwardly. Furthermore, the vent 91 permits any oil that may have escaped past the piston to return to the receiver, and the receiver 22 may be vented to the atmosphere.

Power may be supplied to the outlet box 19 from a suitable source of electrical energy, through the medium of the wires 20, and the wires 90 lead from the outlet 19 to the motor 18. The manual control switch 70 has three positions. Thus, when the handle 74 is moved up, the contact 101 and 73 will be closed to thereby start the motor 18 and raise the table 15. As shown in Figure 2, the switch 70 is in a neutral position so that the contact 100 is out of engagement with the contact 73, and the contact 102 is out of engagement with the contact 72. When the handle 74 is moved downwardly, the contact 102 will engage the contact 72 to open the solenoid valve 62 and thus permit fluid to flow through the conduit 49 when the valve 45 is opened by means of the cable 32.

The switch 70 is constructed so that by moving the handle 74 in one direction, the motor 18 will be energized whereby oil will be pumped from the tank 22 by means of the pump 21 up through the conduit 47 to the bottom of the cylinder 36. The lever 43 can be pivoted through the medium of the cable 32 and spring 46. As the lever 43 pivots, the parts move from the position shown in Figure 5 to the position shown in Figure 6 whereby the head 56 closes the opening 55 so that fluid can not flow from the conduit 48 to the conduit 49. This fluid being pumped into the lower end of the cylinder 36 causes the piston 37 to be raised to thereby raise the piston rod 38 and as this raises the platform 15 the rod 38 is connected to the platform 15. When the platform 15 moves to its uppermost position, it engages the finger 86 of the limit switch 78 and thereby moves the lever 80 out of engagement with the contact 82. In the switch 78, the spring 87 normally biases or urges the lever 80 into engagement with the contact 83 as soon as the platform 15 lowers sufficiently. However, the switch 78 opens when the platform 15 is all the way up. In Figure 2, the table or platform 15 is all the way up. When the platform 15 starts down, the spring 87 in the switch closes the circuit.

When the table or platform 15 is all the way up and a man gets on the platform, the beef can be readily cut. Initially the valve 60 is set by means of the handle 61 so that the hydraulic fluid will flow through the valve 60 at a desired rate whereby the rate of descent of the platform 15 can be regulated or controlled. Next, with the platform all the way up, the handle 74 can be moved down to cause the contact 102 to engage the contact 72 so as to permit the hydraulic fluid to flow through a desired line or conduit. The valve 62 is normally closed. Fluid will be pumped under pressure to raise the piston which raises the platform. When the platform goes all the way up, the limit switch 78 opens the circuit. It is to be noted that the standard 25 and arm 26 move up and down with the platform 15. The valve 45 is normally open, and the valve 45 moves up and down as the platform 15 moves up and down, and the cylinder 36 is stationary.

The parts can be constructed so that the platform 15 will move from a high position of approximately five feet above the floor to a low position of one foot above the floor to permit the operator to be in a standing position during the entire operation of splitting the carcass. The hydraulic pump and cylinder are used for raising the platform 15 and the pump 21 is operated by the motor 18. The numeral 19 designates a suitable electrical fixture which may be provided with a magnetic switch therein that is controlled by the limit switch 78. The counterweight 35 helps to balance the tool 34. The platform and tool 34 move down together so that the carcasses can be cut.

I claim:

1. In a cutting assembly, a frame, a base arranged below said frame, guide bars extending upwardly from said base and secured thereto, a movable platform slidably engaging said bars, a track spaced from said frame, a carriage mounted on said track and including a depending hook, a tank and hydraulic pump mounted on said base, a motor for operating said pump, a cylinder secured to said frame and including a movable piston having a rod secured to said platform, a standard extending upwardly from said platform and secured thereto, an arm extending outwardly from the upper end of said standard, pulleys journaled on said arm, a pulley adapted to be connected to a ceiling, a cable arranged in engagement with said last named pulley and having a counterweight connected thereto, said cable adapted to be connected to a cutting implement, a bracket extending outwardly from said standard, an automatic control valve connected to said bracket, a lever pivotally connected to said bracket for controlling the flow of fluid through said automatic control valve, a coil spring connected to said lever, a cable connected to said lever and engaging the pulleys on said arm, conduits connecting said automatic control valve to said tank and to the lower end of said cylinder, a conduit connecting said pump to the lower end of said cylinder, a solenoid valve mounted in the conduit extending between said tank and automatic control valve, and a manually operable switch connected to said frame and electrically connected to said solenoid valve and to said motor.

2. The structure as defined in claim 1, wherein the upper surface of said platform is roughened.

3. The structure as defined in claim 1, and further including a throttle valve mounted in the conduit extending between said tank and automatic control valve.

4. The structure as defined in claim 1, and further including a limit switch actuated by said platform when said platform is in its uppermost position.

References Cited in the file of this patent

UNITED STATES PATENTS

| | | |
|---|---|---|
| 556,956 | Boyd | Mar. 24, 1896 |
| 1,620,035 | Paxton | Mar. 8, 1927 |
| 1,699,695 | Feister | Jan. 22, 1929 |
| 2,634,457 | Moyer et al. | Apr. 14, 1953 |